United States Patent [19]
Graham et al.

[11] Patent Number: 5,664,482
[45] Date of Patent: Sep. 9, 1997

[54] HYDROSTATICALLY-SEALED ATMOSPHERIC SPIRAL SPRAY COOKER

[75] Inventors: Donald L. Graham, Lexington, S.C.; Jerry L. Hope, St. Charles, Ill.

[73] Assignee: Beltec International, Aurora, Ill.

[21] Appl. No.: 713,753

[22] Filed: Sep. 13, 1996

[51] Int. Cl.[6] .............. A47J 27/14; A47J 37/12; A21B 5/08; A23L 1/01
[52] U.S. Cl. .............. 99/330; 99/345; 99/404; 99/407; 99/443 C; 99/446; 99/516
[58] Field of Search .............. 99/325, 330, 331, 99/345–347, 352, 355, 360, 361, 403–408, 409, 443 C, 443 R, 444–446, 477, 478, 516, 534, 536, 483; 198/630, 736, 739, 740; 426/511, 438, 439, 509, 523

[56] References Cited

U.S. PATENT DOCUMENTS

| | | |
|---|---|---|
| 1,424,500 | 8/1922 | McCulloch . |
| 3,408,922 | 11/1968 | Mencacci et al. . |
| 3,608,475 | 9/1971 | Scott . |
| 3,678,244 | 7/1972 | Worline . |
| 3,736,860 | 6/1973 | Vischer, Jr. . |
| 3,834,408 | 9/1974 | Thalacker . |
| 4,047,476 | 9/1977 | Liebermann . |
| 4,134,998 | 1/1979 | Liebermann . |
| 4,152,975 | 5/1979 | Jones .............. 99/352 |
| 4,155,293 | 5/1979 | Spiel et al. .............. 99/404 X |
| 4,167,585 | 9/1979 | Caridis et al. . |
| 4,170,659 | 10/1979 | Totino et al. .............. 428/439 X |
| 4,224,862 | 9/1980 | Liebermann et al. . |
| 4,306,857 | 12/1981 | Hofstetter et al. . |
| 4,363,263 | 12/1982 | Williams . |
| 4,366,749 | 1/1983 | Caridis et al. .............. 99/355 X |
| 4,455,942 | 6/1984 | Wenzel . |
| 4,460,822 | 7/1984 | Alden et al. . |
| 4,478,140 | 10/1984 | Bullock .............. 99/404 |
| 4,582,047 | 4/1986 | Williams . |
| 4,737,373 | 4/1988 | Forney . |
| 4,745,854 | 5/1988 | Buckley . |
| 4,807,524 | 2/1989 | Ikeuchi et al. .............. 99/353 |
| 4,882,984 | 11/1989 | Eves, II .............. 99/407 X |
| 4,934,259 | 6/1990 | Watanabe . |

(List continued on next page.)

FOREIGN PATENT DOCUMENTS

| | | |
|---|---|---|
| 2633527 | 1/1990 | France . |
| 2121577 | 11/1971 | Germany . |
| 1119675 | 2/1976 | Japan . |
| 1059933 | 8/1981 | Japan . |
| WO87/06445 | 11/1987 | WIPO . |

*Primary Examiner*—Timothy F. Simone
*Attorney, Agent, or Firm*—Wallenstein & Wagner, Ltd.

[57] ABSTRACT

A low-temperature water-based atmospheric cooker for food products such as fish, meat and poultry is provided, and includes a hydrostatically-sealed cooking chamber having in upper wall and a supporting side wall, a conveyor belt within the cooking chamber having an inner-most edge and an-outer most edge, the belt having a path rising circuitously within the cooking chamber wherein each tier of the conveyor belt generally passes over another tier of the conveyor belt to form a generally spiral central belt path within the chamber, an entry portion of the belt path receiving uncooked food product into the cooking chamber, an exit portion of the belt path for discharging cooked food product from the cooking chamber; means for supporting the conveyor belt in the generally spiral central belt path; means for driving the conveyor belt in the generally spiral central belt path; a reservoir of heated water for spraying onto the food products; a plurality of outer water-spraying nozzles for spraying the heated water onto the food product and for creating a cooking atmosphere within the hydrostatically-sealed cooking chamber, the plurality of outer water-spraying nozzles generally surrounding the belt path from a direction facing inward towards the outer-most edge of the belt; and, a plurality of inner water-spraying nozzles for spraying the heated water onto the food product and for creating a cooking atmosphere within the hydrostatically-sealed cooking chamber, the plurality of inner water-spraying nozzles generally surrounding the central belt path from a direction facing outward towards the inner-most edge of the belt.

30 Claims, 3 Drawing Sheets

U.S. PATENT DOCUMENTS

| | | |
|---|---|---|
| 4,949,629 | 8/1990 | Leary et al. . |
| 4,966,072 | 10/1990 | Ellis-Brown . |
| 5,002,616 | 3/1991 | Ketelhohn . |
| 5,009,150 | 4/1991 | Andersen . |
| 5,066,505 | 11/1991 | Vos et al. . |
| 5,101,714 | 4/1992 | Grandi ................................. 99/330 X |
| 5,161,457 | 11/1992 | Evans . |
| 5,307,736 | 5/1994 | Sorensen ................................. 99/330 |
| 5,417,153 | 5/1995 | King et al. ................................. 99/517 |
| 5,442,995 | 8/1995 | Greer ................................. 99/487 |
| 5,525,367 | 6/1996 | King et al. ................................. 426/433 |
| 5,570,626 | 11/1996 | Vos ................................. 99/404 |

HYDROSTATICALLY-SEALED ATMOSPHERIC SPIRAL SPRAY COOKER

DESCRIPTION

Technical Field of the Invention

The present invention generally relates to atmospheric and vapor cooking and related cooking and pasteurization processes, and, in particular to a unique spiral atmospheric cooker and food pasteurization process at a relatively low temperature and high speed for food products, such as poultry, meat, and fish.

BACKGROUND OF THE INVENTION

The generally accepted time and temperature conditions which define when a food product is fully cooked is an internal temperature of the food product of at least 160 degrees Fahrenheit. Upon reaching this internal temperature, it has been determined that virtually all bacterial pathogens in the food product are rendered non-pathogenic. Because meat and poultry food products are predominantly water, if internal temperatures of food product of at least 160 degrees Fahrenheit are achieved rapidly, such as through frying, broiling or grilling, moisture is driven from the food product. As a result, the food product is rendered dry, tasteless and generally unappealing. While raising the temperature of the food product slowly results in the lowest dissipation of moisture, such extended cooking is not possible in many restaurants, particularly fast food restaurants. Hence, processors of meat and poultry products, such as de-boned chicken or ground beef meat patties, deliver such products to restaurants in frozen, but precooked, states. That is, the internal temperature of the product was raised to at least 160 degrees Fahrenheit at the food processing facility. Cooking time at a restaurant is therefore reduced as the frozen food product need only be thawed and warmed to a palatable temperature.

To effect gradual cooking of the food product to minimize water loss, food processors have utilized horizontally oriented linear cookers or vertically oriented spiral steam cookers. Spiral steam cookers are often preferred due to lesser floor space requirements. Because of their configuration, spiral steam cookers provide extended exposure of the food product to boiling water temperatures in order to gradually elevate internal temperatures of the food product. Examples of spiral steam cookers are seen in U.S. Pat. Nos. 4,363,263; 4,582,047 and 4,737,373. The steam temperature and, thus, the cooking chamber in such prior art spiral steam cookers is maintained at a constant, typically from at least 160 to about 212 degrees Fahrenheit.

A problem with these and other prior art spiral steam cookers and related cooking methods is the inability to reach a uniform internal product temperature and the extended time required for raising the internal temperature of the food product to the required temperature of at least 160 degrees Fahrenheit. Such extended cooking times prevents high rates of production of cooked food product. Some of these problems may be linked to these steam cookers not quickly and evenly breaking down the thermal barriers of the food products to be cooked.

In addition, where steam temperatures in prior art cookers are elevated, they are often too high to optimize the desirable moisture content of the food product and are not uniform throughout the cavity of the cooker. However, a reduction in steam temperature to maximize moisture content would further prolong cooking times.

Hence, prior to the present invention, a need existed for a spiral spray cooker which results in higher rates of heat transfer production of cooked food product, which provided a more even distribution of the heat transfer throughout the product, while utilizing reduced vapor temperatures to preserve the maximum moisture content of the food product by precise internal, equilibration temperature in the center of the product.

U.S. Pat. No. 5,189,948, to Lieberman, (the "'948 patent") discloses one attempt to solve some of these problems. Specifically, the '948 patent uses a lower temperature water vapor spiral cooker with a downwardly flowing source of water underneath the food product to cook the food product. The water underneath the food product is allowed to drip down onto food product beneath it. Art exterior hot water spray is also used to decrease loss of moisture and to help thermalize the food product on the conveyor belt. However, the hot water spray in the '948 patent is only directed inward toward a U-shaped channel that encompasses the food product on both sides of the food product, thereby preventing more direct contact of the water with the food product. In addition, since the water spray only comes from the exterior of the spiral belt, the portion of the food product nearest to the exterior of the spiral belt will have a tendency to cook more quickly than the portion nearest the interior of the spiral belt. Thus, the U-shaped channel and the water spray only being on the exterior of the spiral belt create several problems. In addition, the inlet and outlet of the cooking chamber are not sealed, thereby preventing an optimal cooking atmosphere near and around the inlet and outlet, and thereby allowing for a chimney-like effect to take place. Further, there is significant heat and moisture loss through the inlet and outlet of the cooking apparatus disclosed in the '948 patent. Moreover, the water sprayed from the hot water spray is not recycled back to the sprayers, thereby preventing the flavor-enhancing juices from the food product, which end up in the reservoir, from being re-sprayed onto the food product.

The present invention is directed to solving these and other problems.

SUMMARY OF THE INVENTION

The present invention is a low-temperature water-based atmospheric spiral cooker for food products such as fish, meat, and poultry. The atmospheric spiral cooker includes a hydrostatically-sealed cooking chamber having an upper wall, and a supporting side wall having first, second, third, and fourth walls. The atmospheric spiral cooker also includes a conveyor belt within the cooking chamber having an inner-most edge and an-outer most edge. The belt has a path rising circuitously within the cooking chamber. Each tier of the conveyor belt generally passes over another tier of the conveyor belt to form a generally spiral central belt path within the chamber. An entry portion of the belt path is provided for receiving uncooked food product into the cooking chamber, and an exit portion of the belt path is provided for discharging cooked food product from the cooking chamber.

The atmospheric spiral cooker also includes means for driving the conveyor belt in the generally spiral central belt path. The driving means includes a central drive member extending downwardly from the upper wall, and rotatable in relation to the inner water-spraying nozzles. The driving means also includes a plurality of drive brackets extending outwardly from the central drive member toward the central belt path. The drive brackets are connected to the central drive member at a position that is above the upper-most nozzles of the plurality of inner water-spraying nozzles, in order to clear the upper-most nozzles of the plurality of inner water-spraying nozzles when the central drive member rotates in relation to the inner water-spraying nozzles. The driving means also includes a belt drive frame. The central drive member and the drive brackets are connected to and support/drive the belt drive frame. The belt drive frame allows water sprayed by the inner water-spraying nozzles to directly contact the food product. The belt drive frame, and a plurality of vertically oriented driving members attached thereto, frictionally engage the conveyor belt to drive the belt within the belt path. The belt is supported about the belt drive frame with a plurality of support posts, and a plurality of support tiers attached to each of the support posts. The support posts and the support tiers are stationary, and the support tiers support the belt from under each tier of the belt path.

The atmospheric spiral cooker also includes a reservoir of heated water for spraying onto the food products, and a plurality of outer water-spraying nozzles for spraying the heated water onto the food product. The water-spray nozzles are also used for creating a cooking atmosphere within the hydrostatically-sealed cooking chamber. The outer water-spraying nozzles generally surround the belt path from a direction facing inward towards the outer-most edge of the belt. Also provided is a plurality of inner water-spraying nozzles for spraying the heated water onto the food product and for creating a cooking atmosphere within the hydrostatically-sealed cooking chamber. The plurality of inner water-spraying nozzles generally surround the central belt path from a direction facing outward towards the inner-most edge of the belt.

The cooking chamber further includes a hydrostatically-sealed entry opening within the supporting side wall for allowing the food product to enter the cooking chamber. A first hydro-sealing basin is provided for retaining water and maintaining a water level within the first basin that hydrostatically seals the entry opening. An entry conveyor belt and a hold-down belt are provided for moving the food product through the entry opening. The cooking chamber further includes a hydrostatically-sealed exit opening within the supporting side wall, for allowing the food product to exit the cooking chamber. A second hydro-sealing basin is provided for retaining water and maintaining a water level within the second basin that hydrostatically seals the exit opening. An exit conveyor belt and a hold-down belt are provided for moving the food product through the exit opening.

Other features, advantages, and aspects of the present invention will become apparent upon making reference to the specification, claims, and drawings to follow.

DETAILED DESCRIPTION OF THE INVENTION

Figure 1:
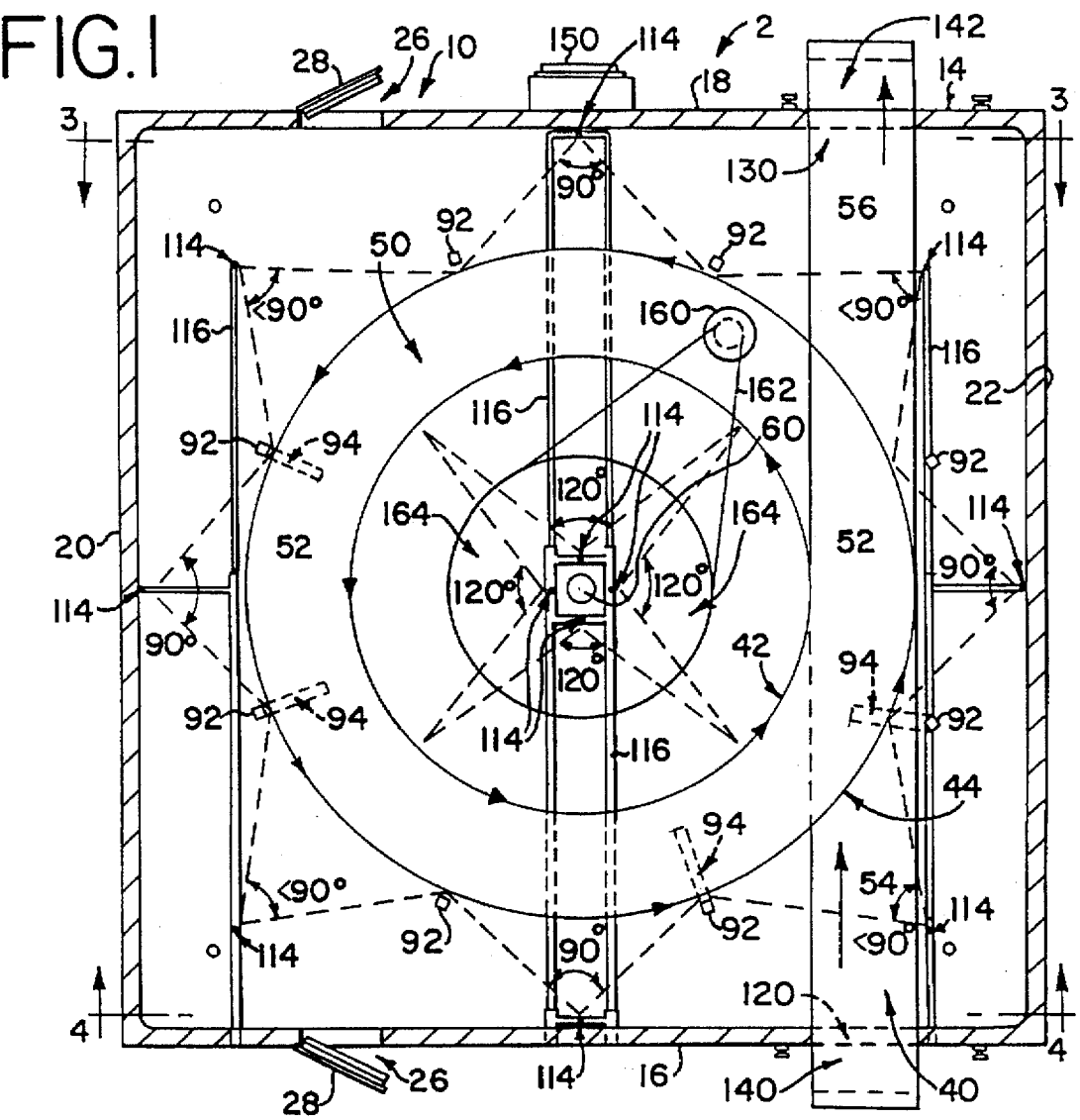
FIG. 1 is a cut-away top view of the atmospheric spiral cooker, showing generally the belt path therein.

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to embodiments illustrated.

Referring now to the drawings, FIG. 1 shows a cutaway top view of a low-temperature water-based atmospheric cooker 2, for cooking or pre-cooking food products such as fish, meat, and poultry. This cooker 2 comprises a cooking chamber 10 having an upper wall 12 and a supporting side wall 14. The cooking chamber 10 is typically insulated to prevent heat loss, and to assist in maintaining the required temperatures within the cooking chamber 10. The side wall 14 shown has first, second, third, and fourth walls 16, 18, 20, 22 therein. The supporting side wall 14 supports the upper wall 12. A base 24 is also provided for supporting the side wall 14. The upper wall 12, the side wall 14, and the base 24, together, generally form the cooking chamber 10. The cooking chamber 10 further includes pressure release port 26 for relieving excess pressure within the cooking chamber 10. A spring-loaded port cover 28, or other pressure release device, can be used in conjunction with the port 26 to maintain a particular pressure within the cooking chamber 10. More than one port 26 and port cover 28 can be used to perform this pressure release function.

The cooker 2 also includes a conveyor belt 40 within the cooking chamber 10. The conveyor belt 40 can have ½ inch holes (not shown) for permitting passage of water through the belt. This passage of water through the belt 40 allows the water and flavors on the food product above (food product on belt at one tier) to drip down onto the food product below (food product on belt at another tier just below the one tier). This creates a raining effect within the cooking chamber 10. The conveyor belt 40 is preferably made from a stainless-steel mesh belt. The conveyor belt 40 has an inner-most edge 42 and an outer-most edge 44. The belt 40 has a path that begins at a lower portion of the cooking chamber 10 and rises circuitously within the cooking chamber 10, as shown, and upwardly conveys food product within chamber 10. The path is preferably spiral, which lengthens the time exposure of food product being cooked to the various temperature and humidity (atmospheric) conditions found within chamber 10. Each tier 50 of the conveyor should be spaced closely together, about 4 inches apart, to optimize the process of the water and flavors on the food product above dripping down onto the food product below, mentioned above. The conveyor belt 40 can be driven by a variable speed motor or a constant speed motor, or drive 160, with a variable speed motor enabling the shortening or lengthening of the cooking time. However, cooking times can be also be modified by changing the cooking temperatures, although most cooking applications with the present invention keep the temperatures constant, and the belt speed is varied according to the food product being cooked. The drive 160 is shown in FIG. 1, and the connections will be described in more detail further below.

As the conveyor belt 40 begins to rise in a circular fashion within the cooking chamber 10, the conveyor belt 40 generally overlaps itself creating a plurality of tiers 50. Each tier 50 of the conveyor belt generally passes over another tier 50 of the conveyor belt 40 to form a generally spiral central belt path 52 within the chamber 10. An entry portion 54 of the belt path 52 receives uncooked food product into the cooking chamber 10, and an exit portion 56 of the belt path discharges cooked food product from the cooking chamber 10. In use, the entry portion 54 is about three (3) feet off the ground, while the exit portion 56 is near the top of the chamber 10. A counter-weight apparatus with a counter-weight (not shown) can be used to keep the belt 40 taught or tensioned throughout the path that the belt 40 passes through. Other types of tensioning mechanisms, such as a counter-motor can be used, as is well known.

Figure 3:
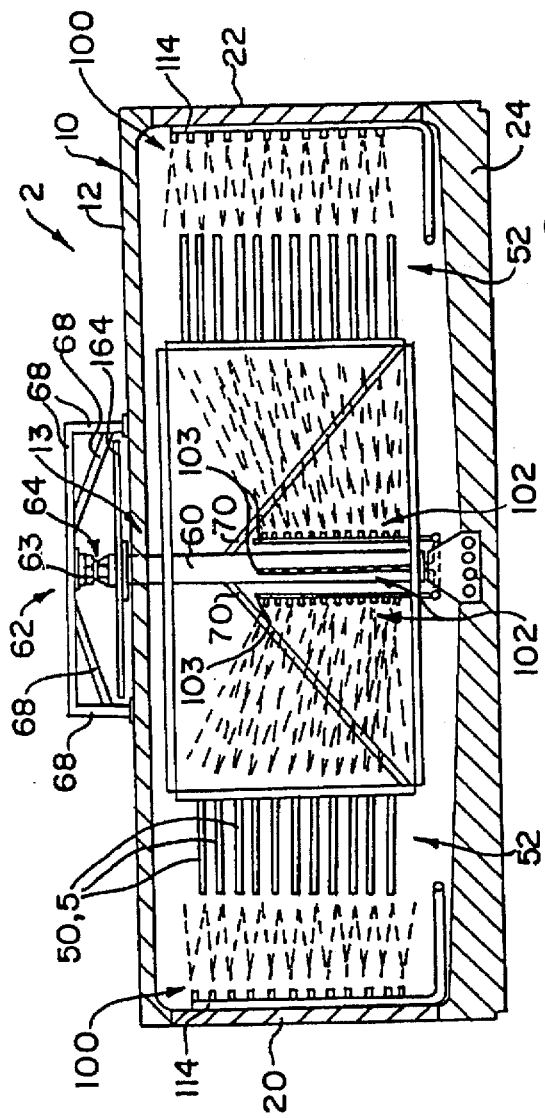
FIG. 3 is a partial cut-away back view of the atmospheric spiral cooker from FIG. 1.
Figure 4:
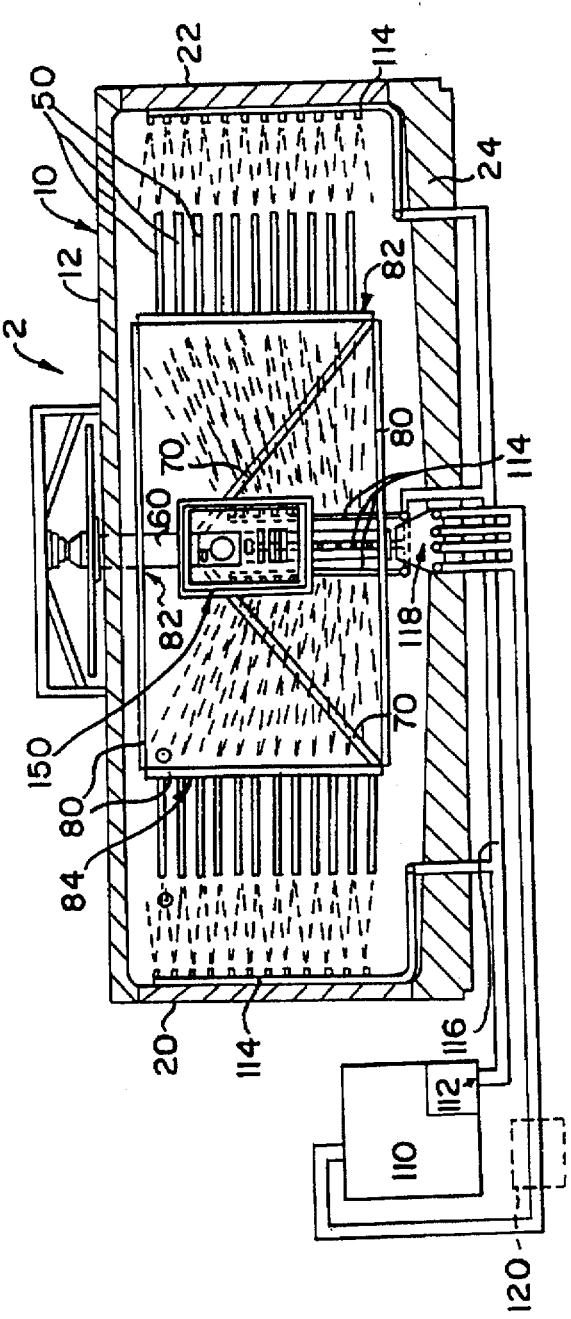
FIG. 4 is a cut-away front view of the atmospheric spiral cooker from FIG. 1; and, FIG. 5 is a cut-away side view of the sealing apparatus of the preferred embodiment of the entry and exit portion of the belt path of the present invention.

The spiral cooker 2 also includes an assembly for driving the conveyor belt in the generally spiral central belt path 52. One such assembly is shown in FIGS. 1, 3 and 4. This assembly includes a central drive member 60. This central drive member 60 can be a metal column or shaft capable of driving the associated apparatus and the conveyor belt 40. The central drive member 60 extends downwardly from the upper wall 12. The upper wall 12 has a central port 13 through which the central drive member 60 extends. The central drive member 60 is rotatably connected to a central mounting apparatus 62 about a pivot point 64. The central mounting apparatus 62 includes a swivel mount 63 pivotally connected to and supporting the central drive member 60. The swivel mount 63 is attached to a support structure 68, which is in turn attached to the upper wall 12.

The spiral cooker in FIGS. 1, 3 and 4 further includes a plurality of drive brackets 70 extending outwardly from the central drive member 60 toward the central belt path 52. The drive brackets 70 together generally create an upside-down cone shape, as can be seen as an upside-down V in FIGS. 3 and 4. However, this shape is not solid, and only takes on a frame-like structure for allowing water to easily pass therethrough. The spiral cooker 2 also includes a plurality of outer water-spraying nozzles 100 for spraying heated water onto the food product and for creating a cooking atmosphere within the cooking chamber 2, as will be described in detail further below. The plurality of outer water-spraying nozzles 100 generally surround the belt path 52 from a direction facing inward towards the outer-most edge 44 of the conveyor belt 40. A plurality of inner water-spraying nozzles 102 is also provided for spraying heated water onto the food product, and for creating a cooking atmosphere within the cooking chamber. The plurality of inner water-spraying nozzles 102 generally surround (from an interior spaced relation with) the central belt path 52 from a direction facing outward towards the inner-most edge 42 of the conveyor belt 40. The drive brackets 70 are connected to the central drive member 60 at a position that is above the upper-most nozzles 103 of the plurality of inner water-spraying nozzles 102 to clear the upper-most nozzles 103 of the plurality of inner water-spraying nozzles 102 when the central drive member 60 rotates in relation to the inner water-spraying nozzles 102. The central drive member 60 is, thus, rotatable in relation to the inner water-spraying nozzles 102. A reservoir of heated water 110 (shown in FIG. 4) is also provided for containing and heating water that will be spraying onto the food product with the outer and inner nozzles 100, 102. The spraying of water onto the belt 40 and food product assists in keeping the belt 40 clean.

The cooker 2 further includes a belt drive frame 80 connected to the central drive member 60 at a connection point 82. The belt drive frame 80 is also connected to the drive brackets 70. The central drive member 60 and the drive brackets 70 both assist in driving the belt drive frame 80. Vertical driving members 84 of the belt drive frame 80 allow water sprayed by the inner water-spraying nozzles 102 to directly contact the food product. In other words, the vertical driving members 84 are in column form, and the belt drive frame 80 is not a solid drum arrangement, thereby allowing air and water to pass through this frame-like structure.

The plurality of tiers 50 of the belt 40, within the central belt path 52, are supported by a plurality of stationary horizontally oriented support tiers 94 (some shown in FIG. 1, but not shown in FIGS. 3 or 4) that are connected to and supported by a plurality of stationary vertically oriented support posts 92, with the support posts 94 being secured to the base 24 of the cooker 2. The plurality of support tiers 94 are located under each tier 50 of the belt 40, and extending under the belt 40 from each of the plurality of support posts 92. Tier rollers (not shown) can be connected, as a separate element, or as a part of the support tiers 94 for reducing friction of the belt 40 moving over the support tiers 94. The inner-most edge 42 of the plurality of tiers 50 of the belt 40, within the central belt path 52, are frictionally in contact with the vertical driving members 84 of the belt drive frame 80. When the central drive member 60 is rotated and driven by a motor or drive, the vertical driving members 84 of the belt drive frame 80 drive the belt, in frictional contact therewith in the belt path 52. It should be understood that, based on the weight of the belt 40, some slippage occurs between the belt 40 and the belt drive frame 80. However, the belt 40 can be kept taught, and in good frictional contact with the belt drive frame 80, with the use of a damping weight or counter weight connected to the belt. These types of belt tightening methods are well known.

A control panel 150 is provided for, at least, controlling temperatures and speed of operation of, for example, water flows and belt speeds. Emergency stops can be provided at various locations on the cooker 2. The drive 160, mentioned above, is rotatably connected with a drive belt 162 to a circular drive plate 164. The drive plate 164 is fixedly attached to, and rotatable with, the central drive member 60. Thus, the drive 160, connected to the control panel 150, Controls the rotation of the central drive member 66, and, thus, the rotation of belt drive frame 80 and the conveyor belt 40.

The water-spraying nozzles 100, 102 are connected and disposed on water-supply rods 114. The embodiment shown in FIG. 1, uses four (4) interior rods 114 and eight (8) exterior or perimeter rods 114 within the cooking chamber 10. The water-supply rods 114 are aqueously connected to the reservoir of heated water 110 through supply pipes 116. When the heated water is sprayed onto the food product within the cooking chamber 10, the water will fall to the base 24 and flow into a drain 118. The drain 118 can also include a pump (not shown) for pumping the water to the reservoir 110, and/or a filter or screen to assist in filtering out clogging materials. As such, the sprayed water then flows, or is pumped into, the reservoir 110, for returning the water to the heated water source or reservoir 110. The water within the reservoir can be treated with flavor enhancers, such a spices and salts, to enhance the flavor of the food products being cooked. The juices and/or natural flavors of the food product being cooked also fall to the base of the cooker 2 and end up in the reservoir 110. Thus, the water, flavor enhancers (if used) and natural juices and/or flavors of the food product are all recycled or recirculated, and used again to spray onto the food product through the nozzles 100, 102. Hence, the recirculated water develops into a cooking brine which is further used in the cooking process of the present invention. A filtering system 120, for filtering the sprayed water, can also be used to prevent build-up of unwanted flow deterrents (clogging materials) within the piping, flow conduits, and nozzles. The filter can be a 60 to 80 micron stainless-steel screen. The water and other ingredients within the reservoir 110 are pumped to the spray nozzles 100, 102 With a pump 112 through supply pipes 116 and water-supply rods 114, as mentioned above.

The reservoir 110 may be integral with the chamber 10 or may comprise a tank or container separate from the chamber 10, as shown in FIG. 4. Where the reservoir 110 is integrated with the chamber 10, the reservoir 110 should be separated from cooking space within the chamber 10 by an insulating partition (not shown). The partition would prevent water vapor rising from the heated water within reservoir 110 from interfering with the spray-created atmosphere within the chamber 10. The reservoir 110 itself can be equipped with an electrical heating means, a float valve and filtration system 110, and a thermostatically controlled water pump 112, as one unit.

Figure 5:
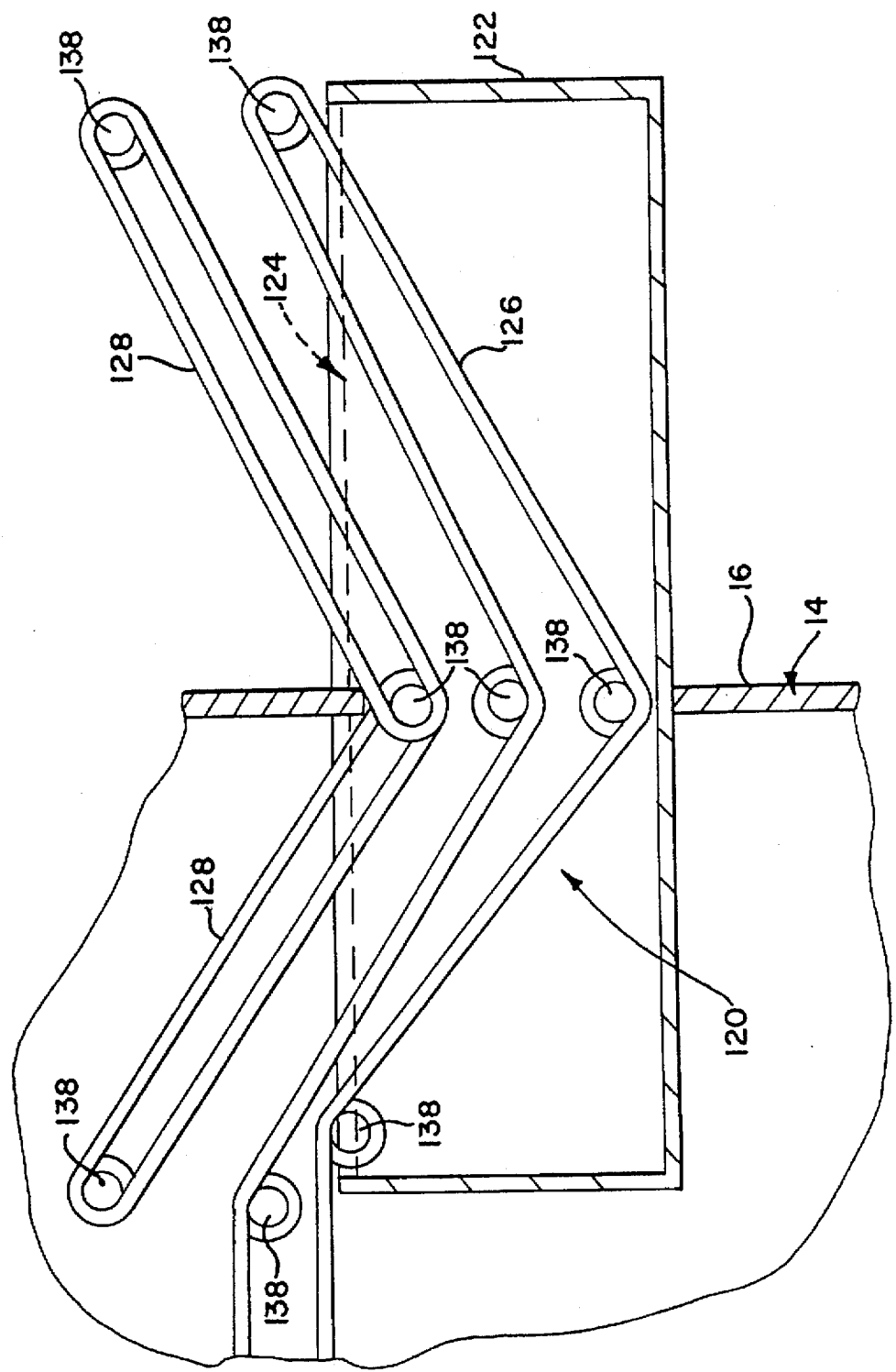

Referring to FIGS. 1 and 5, the spiral cooker 2 also includes a hydrostatically-sealed entry opening 120 within the supporting side wall 14, and specifically, within the first wall 16 thereof. The entry opening is provided for allowing the food product to enter the cooking chamber 10. A first hydro-sealing basin 122 is provided for retaining water therein, and for maintaining a water level 124 within the basin 122 that hydrostatically seals the entry opening. An entry conveyor belt or pass-through conveyor belt 126, and a hold-down belt 128 are provided for moving the food product through the entry opening 120.

Figure 2:
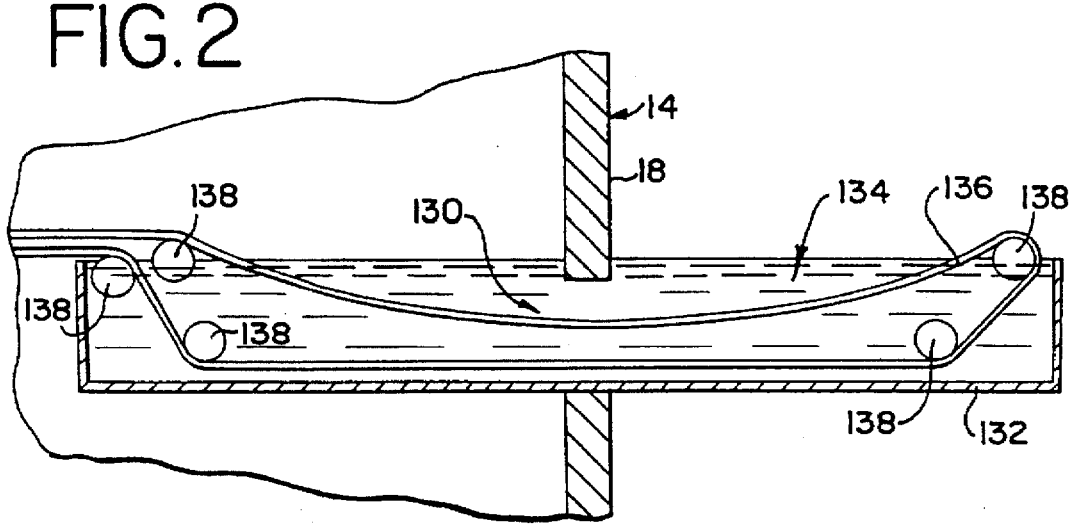
FIG. 2 is a cut-away side view of the sealing apparatus of an alternative entry or exit portion of the belt path of the present invention.

Referring to. FIGS. 1 and 2, the spiral cooker 2 further includes a hydrostatically-sealed exit opening within the supporting side wall 14, and specifically within the second wall 18 thereof. The exit opening 130 is provided for allowing the food product to exit the cooking chamber 10. A second or additional hydro-sealing basin 132 is provided for retaining water and maintaining a water level 134 within the basin 132 which hydrostatically seals the exit opening 130. An exit conveyor belt 136 is provided for moving the food product through the exit opening 130. The portion of the belt which moves trough the entry opening 120 of the chamber 10 can be called an entry portion 140 of the belt/belt path for allowing uncooked food product to enter into the cooking chamber 10. Likewise, the portion of the belt which moves through the exit opening 130 of the chamber 10 can be called an exit portion 142 of the belt/belt path for discharging cooked food producT from the cooking chamber 10. A water heater (not shown) is preferably provided in conjunction with each of the basins 122, 132 for maintaining the water therein at about 188 degrees Fahrenheit.

As mentioned, this configuration of allows for the food product to pass into and out of the cooking chamber 10, while at the same time provides a hydrostatic seal for the chamber 10. This hydrostatic seal allows for a cooking atmosphere to be created, as will be described in more detail further below, and allows for the cooking atmosphere to be maintained within the chamber 10. Rollers 138 are provided for the pass-through conveyor belt 126, the hold-down belt 128, and exit conveyor belt 136, as can be understood from FIGS. 2 and 5. The apparatus shown in FIG. 2 does not use a hold down belt, and thus, the orientation of the food product can not be guaranteed at the exit of the opening. Therefore, it should be understood that the preferred embodiment of the present invention uses a hold down belt, as shown in FIG. 5, for both the entry opening 120 and the exit opening 130. Further, the sealed entry and exit configuration eliminates the chimney effect that took place in previous cookers using entry and exit openings that allowed air to pass therethrough.

Several general cooking concepts for the application of the present invention, such as microwaving as a pre-cooking step, as well as flash freezing as a post-cooking step, and the devices associated therewith, are known to one skilled in the art, and are generally represented in U.S. Pat. No. 5,189,948, which is incorporated herein by reference. In further describing the operation of the present invention, the heated water being sprayed from the nozzles 100, 102 is preferably about 196–198 degrees Fahrenheit, and the temperature within the chamber is preferably about 190–192 degrees Fahrenheit. With the use of the numerous spray nozzles 100, 102 creating cyclone-like or hurricane-like atmosphere within the chamber 10, the thermal barriers of the food product are broken down more quickly and more evenly, and allows for a lower cooking or atmospheric temperature to be used within the chamber 10. It should be noted, and has been observed, that with the present invention, the atmosphere within the cooking chamber 10, for the most part, is what cooks the food product, while the direct contact of the water with the food product provides enhanced cookability of the food product. For example, the use of spray nozzles 100, 102 with the sprayed hot water directly contacting the food product also assists in preventing moisture loss in the food product. The water distribution, thus, takes place 100% of the time throughout the entire cooking chamber, and creates a 100% humidity atmosphere, except that spray nozzles 100,102 are not used until about the 3rd revolution up the cooking chamber. Not using the spray nozzles 100,102 in the first few revolutions allows the food temperature to raise at a slower rate, before the thermal barriers are broken down with the use of the nozzles 100,102. The creation of the sealed atmosphere with the nozzles 100,102, in turn, allows the food to be cooked at higher temperatures, without the threat of moisture loss, thereby allowing for a higher speed of conveying the food product through the spiral cooker 2. In most applications, it is preferable to keep the temperatures constant, and vary the belt speed to achieve a properly cooked food product. A target of about 196 to 198 degrees F. exists within the cooking chamber 10, with a target temperature of the food product at about 192 degrees F. Thus, a differential temperature of about 6–8 degrees F. is targeted between the atmosphere in the cooking chamber 10 and the finished food product, with about a 4–6 degrees F. differential between the air temperature in the cooking chamber 10 and the water temperature that is sprayed through the nozzles 100,102. However, atmospheric conditions outside the chamber 10, as well as the barometric, pressure will cause some of the cooking parameters to be adjusted.

Besides the atmospheric type cooking achieved by the present invention, the cooker 2 of the present invention also, in small part, achieves conduction cooking of food product carried on conveyor belt 40. In particular, the hot water from the spray nozzles 100, 102 thermalizes both the food product carried on conveyor belt 40, and also heats the stainless-steel mesh conveyor belt 40. The heat from the conveyor belt 40 is thereby conducted to the food product.

Another aspect of the present invention includes the particular hot water spray patterns that are created through the number, the type, and the placement of the spray nozzles 100, 102 within the cooking chamber 10. Referring to FIG. 1, the water-supply rods 114 are positioned at intervals surrounding the central belt path 52. The spray nozzles 100, 102 on the rods 114 are chosen to provide particular angles of water spray coverage. In particular, as shown in the embodiment within FIG. 1, angles of coverage are provided as 90 degrees and less then 90 degrees for the outer water-spraying nozzles 100, and as 120 degrees for the inner water-spraying nozzles 102. These angles can be modified by choosing different types of spray nozzles 100, 102 or by using adjustable orifice nozzles. These types of nozzles can provide fine spray jets of water, or coarse jets of water, as required for the particular application. In FIG. 1, the dotted lines projecting from the rods 114, and nozzles 100, 102 connected thereto, show the spray coverage for each rod 114, and spray nozzles 100, 102 thereon. As shown, the spray coverage lines intersect at the outer-most edge 44 of the conveyor belt 40 for the outer water-spraying nozzles 100, and at the inner-most edge 42 of the conveyor belt 40 for the inner water-spraying nozzles 102. It should be understood that this arrangement creates an overlapping water spray coverage from one rod 114 to the next, and complete water spraying of the food product for all of the tiers 50 of the central belt path 52 throughout the entire spiral or circular path therein. This is easily understood by extrapolating or projecting the spray coverage lines within FIG. 1. Preferably, there should be about a 10% overlap of the spray patterns at a point where the food product sits on the belt 40. Based on the angle of coverage being greater for the interior nozzles 102 than for the exterior nozzles 100, the interior nozzles 102 are typically spaced about twice as far from the belt 40 as the exterior nozzles 100. Several of the nozzles shown in FIG. 1 have ⅜ inch orifices. The intervals between the rods 114 and the spacing from the conveyor belt 40 are designed in conjunction with the spray nozzle 100, 102 angles of coverage to achieve overlapping water spray coverage and complete water spraying of the food product, from both sides, throughout the entire central belt path 52.

The spray nozzles 100, 102 are also chosen, preferably with spray pattern that stays generally within a plane, and that plane is oriented in a horizontal fashion, to have the spray pattern reach in between the tiers 50 of the belt path 52. This horizontal spray pattern provides better contact with the food product than other orientations and patterns. In addition, spray nozzles 100, 102 are chosen which provide a range which is capable of reaching the food product without significant dissipation of the water droplets within the spray pattern. As described above, the atmosphere created by these spray patterns, in conjunction with the temperatures of the sprayed water, is maintained within the cooking chamber 10 partially through the sealing of the chamber 10 at the entry end exit openings 120, 130. The pressure release ports 26 also assist in maintaining the atmosphere at the required levels, with these levels depending of the type of food product being cooked or pasteurized.

The water being sprayed from the nozzles 100, 102 preferably comes out of the nozzles 100, 102 in water droplet form, although is could come out of the nozzles 100, 102 in steam, or close to steam form. In addition, the spray rods 114, described above, can be stationary, and can also be rotary. However, stationary rods are preferable within the present invention.

While the specific embodiments have been illustrated and described, numerous modifications come to mind without significantly departing from the spirit of the invention and the scope of protection is only limited by the scope of the accompanying claims.

I claim:

1. A low-temperature water-based atmospheric cooker for food products such as fish, meat and poultry, comprising:

a hydrostatically-sealed cooking chamber having an upper wall and a supporting side wall;

a conveyor belt within the cooking chamber having an inner-most edge and an-outer most edge, the belt having a path rising circuitously within the cooking chamber wherein each tier of the conveyor belt generally passes over another tier of the conveyor belt to form a generally spiral central belt path within the chamber, an entry portion of the belt path receiving uncooked food product into the cooking chamber, an exit portion of the belt path for discharging cooked food product from the cooking chamber;

means for driving the conveyor belt in the generally spiral central belt path;

means for supporting the conveyor belt in the generally spiral central belt path a reservoir of heated water for spraying onto the food products;

a plurality of outer water-spraying nozzles for spraying the heated water onto the food product and for creating a cooking atmosphere within the hydrostatically-sealed cooking chamber, the plurality of outer water-spraying nozzles generally surrounding the belt path from a direction facing inward towards the outer-most edge of the belt; and, a plurality of inner water-spraying nozzles for spraying the heated water onto the food product and for creating a cooking atmosphere within the hydrostatically-sealed cooking chamber, the plurality of inner water-spraying nozzles generally surrounding the central belt path from a direction facing outward towards the inner-most edge of the belt.

2. The low-temperature water-based atmospheric cooker of claim 1 further comprising means for relieving excess pressure within the cooking chamber.

3. The low-temperature water-based atmospheric cooker of claim 1 wherein the means for driving the conveyor belt in the generally spiral central belt path comprises:

a central drive member extending downwardly from the upper wall, and rotatable in relation to the inner water-spraying nozzles; and, a plurality of drive brackets extending outwardly from the central drive member toward the central belt path, the drive brackets being connected to the central drive member at a position that is above the upper-most nozzles of the plurality of inner water-spraying nozzles to clear the upper-most nozzles of the plurality of inner water-spraying nozzles when the central drive member rotates in relation to the inner water-spraying nozzles.

4. The low-temperature water-based atmospheric cooker of claim 3 wherein the means for driving the conveyor belt further comprises a belt drive frame, the central drive member and the drive brackets being connected to and supporting the belt drive frame, the belt drive frame allowing water sprayed by the inner water-spraying nozzles to directly contact the food product.

5. The low-temperature water-based atmospheric cooker of claim 1 wherein the water-spraying nozzles are disposed on water-supply rods, the water-supply rods being aqueously connected to the reservoir of heated water for recycling the heated water sprayed onto the food product.

6. The low-temperature water-based atmospheric cooker of claim 1 wherein the supporting side wall comprises first, second, third, and fourth walls.

7. The low-temperature water-based atmospheric cooker of claim 1 wherein the conveyor belt permits passage of water through the belt.

8. The low-temperature water-based atmospheric cooker of claim 1 further comprising means for returning the sprayed water to the heated water source.

9. The low-temperature water-based atmospheric cooker of claim 8 wherein the means for returning the sprayed water further includes means for filtering the sprayed water.

10. The low-temperature water-based atmospheric cooker of claim 1 wherein the conveyor belt includes a stainless steel mesh belt.

11. The low-temperature water-based atmospheric cooker of claim 1, wherein the hydrostatically-sealed cooking chamber includes a hydrostatically-sealed entry opening within the supporting side wall for allowing the food product to enter the cooking chamber.

12. The low-temperature water-based atmospheric cooker of claim 11 further comprising a hydro-sealing basin for retaining water and maintaining a water level within the basin that hydrostatically seals the entry opening.

13. The low-temperature water-based atmospheric cooker of claim 12 further comprising an entry conveyor belt and a hold-down belt for moving the food product through the entry opening.

14. The low-temperature water-based atmospheric cooker of claim 1, wherein the hydrostatically-sealed cooking chamber includes a hydrostatically-sealed exit opening within the supporting side wall, for allowing the food product to exit the cooking chamber.

15. The low-temperature water-based atmospheric cooker of claim 14 further comprising a hydro-sealing basin for retaining water and maintaining a water level within the basin that hydrostatically seals the exit opening.

16. The low-temperature water-based atmospheric cooker of claim 15 further comprising an exit conveyor belt for moving the food product through the exit opening.

17. A low-temperature water-based atmospheric cooker for food products such as fish, meat and poultry, comprising:
- a hydrostatically-sealed cooking chamber having an upper wall and a supporting side wall;
- a conveyor belt within the cooking chamber having an inner-most edge and an-outer most edge, the belt having a path rising circuitously within the cooking chamber wherein each tier of the conveyor belt generally passes over another tier of the conveyor belt to form a generally spiral central belt path within the chamber, an entry portion of the belt path receiving uncooked food product into the cooking chamber, an exit portion of the belt path for discharging cooked food product from the cooking chamber;
- a reservoir of heated water for spraying onto the food products;
- a plurality of outer water-spraying nozzles for spraying the heated water onto the food product and for creating a cooking atmosphere within the hydrostatically-sealed cooking chamber, the plurality of outer water-spraying nozzles generally surrounding the belt path from a direction facing inward towards the outer-most edge of the belt;
- a plurality of inner water-spraying nozzles for spraying the heated water onto the food product and for creating a cooking atmosphere within the hydrostatically-sealed cooking chamber, the plurality of inner water-spraying nozzles generally surrounding the central belt path from a direction facing outward towards the inner-most edge of the belt;
- a central drive member extending downwardly from the upper wall, and rotatable in relation to the inner water-spraying nozzles;
- a plurality of drive brackets extending outwardly from the central drive member toward the central belt path, the drive brackets being connected to the central drive member at a position that is above the upper-most nozzles of the plurality of inner water-spraying nozzles to clear the upper-most nozzles of the plurality of inner water-spraying nozzles when the central drive member rotates in relation to the inner water-spraying nozzles; and,
- a belt drive frame, the central drive member and the drive brackets being connected to and supporting the belt drive frame, the belt drive frame allowing water sprayed by the inner water-spraying nozzles to directly contact the food product.

18. The low-temperature water-based atmospheric cooker of claim 17 wherein the water-spraying nozzles are disposed on water-supply rods, the water-supply rods being aqueously connected to the reservoir of heated water for recycling the heated water sprayed onto the food product.

19. The low-temperature water-based atmospheric cooker of claim 17 wherein the supporting side wall comprises first, second, third, and fourth walls.

20. The low-temperature water-based atmospheric cooker of claim 17 wherein the conveyor belt permits passage of water through the belt.

21. The low-temperature water-based atmospheric cooker of claim 17 further comprising means for returning the sprayed water to the heated water source.

22. The low-temperature water-based atmospheric cooker of claim 21 wherein the means for returning the sprayed water further includes means for filtering the sprayed water.

23. The low-temperature water-based atmospheric cooker of claim 17 wherein the conveyor belt includes a stainless steel mesh belt.

24. The low-temperature water-based atmospheric cooker of claim 17, wherein the hydrostatically-sealed cooking chamber includes a hydrostatically-sealed entry opening within the supporting side wall for allowing the food product to enter the cooking chamber.

25. The low-temperature water-based atmospheric cooker of claim 24 further comprising a hydro-sealing basin for retaining water and maintaining a water level within the basin that hydrostatically seals the entry opening.

26. The low-temperature water-based atmospheric cooker of claim 25 further comprising an entry conveyor belt and a hold-down belt for moving the food product through the entry opening.

27. The low-temperature water-based atmospheric cooker of claim 17, wherein the hydrostatically-sealed cooking chamber includes a hydrostatically-sealed exit opening within the supporting side wall, for allowing the food product to exit the cooking chamber.

28. The low-temperature water-based atmospheric cooker of claim 27 further comprising a hydro-sealing basin for retaining water and maintaining a water level within the basin that hydrostatically seals the exit opening.

29. The low-temperature water-based atmospheric cooker of claim 28 further comprising an exit conveyor belt for moving the food product through the exit opening.

30. In a low-temperature water-based atmospheric cooker for food products such as fish, meat and poultry, including a cooking chamber having an upper wall and a supporting side wall; a conveyor belt within the cooking chamber, the belt having a path rising circuitously within the cooking chamber wherein each tier of the conveyor belt generally passes over another tier of the conveyor belt to form a generally spiral central belt path within the chamber, an entry portion of the belt path receiving uncooked food product into the cooking chamber, an exit portion of the belt path for discharging cooked food product from the cooking chamber; means for driving the conveyor belt in the generally spiral central belt path; a reservoir of heated water for spraying onto the food products; a plurality of water-spraying nozzles for spraying the heated water onto the food product and for creating a cooking atmosphere within the cooking chamber; an opening within the supporting side wall for allowing the food product to enter or exit the cooking chamber, a hydrostatic-sealing apparatus comprising:

a hydro-sealing basin for retaining water and maintaining a water level within the basin that hydrostatically seals the opening;

a pass-through conveyor belt; and, a hold-down belt, the pass-through conveyor belt and the hold-down belt moving the food product through the opening.

* * * * *

UNITED STATES PATENT AND TRADEMARK OFFICE
CERTIFICATE OF CORRECTION

PATENT NO. : 5,664,482
DATED : September 9, 1997
INVENTOR(S) : DONALD L. GRAHAM and JERRY L. HOPE It is certified that error appears in the above-identified patent and that said Letters Patent is hereby corrected as shown below:

On the title page item [57],
In the Abstract: Line 3, substitute the word "an" for "in".

Column 2, Line 15, substitute the word "An" for "Art"

Column 6, Line 9, substitute "92" for "94"

Column 7, Line 15, substitute "220" for "110"

Column 7, Line 38, substitute "through" for "trough".

Column 7, Line 44, substitute "product" for "producT"

Column 7, Line 49, delete the word "of"

Column 8, Line 47, delete "," (2nd occurrence)

Column 9, Line 51, substitute "it" for "is"

Signed and Sealed this

Fourteenth Day of April, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,664,482
DATED : September 9, 1997
INVENTOR(S) : DONALD L. GRAHAM and JERRY L. HOPE It is certified that error appears in the above-identified patent and that said Letters Patent is hereby corrected as shown below:

Column 6, Line 64, substitute "220" for "120".

In Figure 4, substitute "220" for "120"

Signed and Sealed this

Fourteenth Day of April, 1998

*Attest:*

BRUCE LEHMAN

*Attesting Officer*  *Commissioner of Patents and Trademarks*